United States Patent
Nam

(10) Patent No.: US 7,898,585 B2
(45) Date of Patent: Mar. 1, 2011

(54) FLAT DISPLAY PANEL AND METHOD OF MANUFACTURE

(75) Inventor: Myeongjin Nam, Seoul (KR)

(73) Assignee: LG Electronics Inc., Seoul (KR)

( * ) Notice: Subject to any disclaimer, the term of this patent is extended or adjusted under 35 U.S.C. 154(b) by 833 days.

(21) Appl. No.: 11/855,982

(22) Filed: Sep. 14, 2007

(65) Prior Publication Data

US 2008/0068484 A1 Mar. 20, 2008

(30) Foreign Application Priority Data

Sep. 14, 2006 (KR) .................... 10-2006-0089054

(51) Int. Cl.
*H04N 3/15* (2006.01)
*H04N 5/335* (2006.01)
*G09G 3/36* (2006.01)
*G02F 1/133* (2006.01)

(52) U.S. Cl. .................. 348/302; 345/104; 349/116

(58) Field of Classification Search ............. 345/104; 349/116; 348/294, 302, 308
See application file for complete search history.

(56) References Cited

U.S. PATENT DOCUMENTS

| 6,087,648 A * | 7/2000 | Zhang et al. ............ 250/208.1 |
| 6,243,069 B1 * | 6/2001 | Ogawa et al. ............... 345/102 |
| 2003/0076295 A1 * | 4/2003 | Nakajima ................... 345/156 |
| 2004/0263670 A1 * | 12/2004 | Yamasaki ................... 348/340 |

FOREIGN PATENT DOCUMENTS

JP 11088803 A * 3/1999

* cited by examiner

*Primary Examiner*—Jason Whipkey
(74) *Attorney, Agent, or Firm*—Lee, Hong, Degerman, Kang & Waimey

(57) ABSTRACT

A flat display for use in mobile terminals includes both a display function and a camera function, and the components for each of the functions are disposed on a common transparent substrate. The display function includes a plurality of display pixels, and each display pixel has an associated switching element. The camera function also includes an array of sensing pixels, each sensing pixel having a photo element for controlling the pixel. The camera function may be disposed in a display or a non-display portion of the substrate. By locating the display function and the camera function on a common substrate, image processing time is decreased and the image quality is improved.

15 Claims, 18 Drawing Sheets

FLAT DISPLAY PANEL AND METHOD OF MANUFACTURE

This application claims the benefit of Korean Patent Application No. 10-2006-0089054 on 14 Sep. 2006, which is hereby incorporated by reference for all purposes as if fully set forth herein.

FIELD OF THE INVENTION

The present invention relates to a flat panel display of a mobile terminal having a camera module and a manufacturing method for the flat panel display.

DESCRIPTION OF THE BACKGROUND ART

A charge coupled device (CCD) or a complementary metal oxide semiconductor (CMOS) is used as an image sensor for various devices such as a digital camera, a video camera, a mobile terminal having a camera, a scanner, a digital copying machine, and a facsimile.

Particularly, as multimedia demand is increasing in the mobile terminal market, the number of pixels of the associated camera module has increased to 2, 3, or more megapixels. The camera module is comprised of an image sensor, a integrated drive circuit, a lens, a shutter, and a signal processing circuit.

As the number of pixels in the image sensor increases, the camera module size becomes correspondingly larger thereby creating many obstacles to the terminal design. Moreover, as the number of pixels increases, the image processing speeds need to be improved.

SUMMARY OF THE INVENTION

Accordingly, the present invention is directed to a flat display panel and a method for method of manufacture that substantially obviate one or more problems due to limitations and disadvantages of the related art.

An embodiment of the present invention provides a flat display panel and a method for manufacture in which an image sensor is integrated on a transparent substrate of a flat display panel, either in a display portion or a non-display portion of the substrate. Integrating the sensor with the display panel improves image processing time and improves the image quality by reducing noise associated with transmitting signals across connection elements.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with a purpose of the invention, as embodied and broadly described herein, a flat display apparatus includes a first flat display panel further having a display portion and a non-display portion of a transparent substrate wherein a first plurality of pixels and a first plurality of switching elements are disposed on the display portion and wherein the first plurality of pixels is configured to display data under control of the first plurality of switching elements, an image sensor configured to convert an image into an electrical image signal wherein the image sensor is comprised of a second plurality of pixels and a second plurality of switching elements and wherein the image sensor is disposed on the transparent substrate, and an image signals processor configured to convert the electrical image signal into image data for display on the display portion of the first flat display panel.

The image sensor is one of a complementary metal oxide semiconductor (CMOS) and a charge coupled device (CCD), and the first flat display panel is one of a liquid crystal display (LCD), a plasma display panel (PDP), and an organic light-emitting diode (OLED) display device.

The image signal processor is disposed on the non-display portion of the first flat display panel, and at least one gate line and at least one data line are connected between the image sensor and the first plurality of switching elements. The image data of the image signal processor is transmitted to the display portion of the first flat display panel over a data bus.

The flat panel display apparatus may further comprise a second flat display panel configured to display image data from the image signal processor, wherein the second flat display panel is disposed on a rear surface of the first flat display panel. The second flat display panel is one of a liquid crystal display (LCD), a plasma display panel (PDP), and an organic light-emitting diode (OLED) display device The image sensor may be disposed on the non-display portion or the display portion of the transparent substrate.

In another embodiment, the mobile terminal comprises an input unit configured to receive data from a user, a first display unit configured to display data or an image, an image sensor formed on a substrate of the display unit configured to convert an image of a subject into an electrical image signal, an image signal processor configured to convert the electrical image signal from the image sensor into image data for display on the first display unit, and a controller configured to control, responsive to data from the user, the display of data or an image on the first display unit.

The first display unit is comprised of a display portion and a non-display portion. A first plurality of pixels and a first plurality of switching are disposed on the display portion, and the first plurality of pixels is configured to display data under control of the first plurality of switching elements.

The image sensor may be disposed on the non-display or the display portion of the transparent substrate, and is a complementary metal oxide semiconductor (CMOS) or a charge coupled device (CCD).

The image signal processor is disposed on the non-display portion of the transparent substrate.

The mobile terminal further comprises a second display unit configured to display image data from the image signal processor, and the second display unit is disposed on a rear surface of the first display unit.

The first and second display units are a liquid crystal display (LCD), plasma display panel (POP), or an organic light-emitting diode (OLED) display device.

In yet another embodiment of the invention, a method of manufacturing a flat panel display comprises forming a plurality of first switching elements and a plurality of first pixels on a display portion of a transparent substrate, and forming an image sensor on the transparent substrate.

Forming the image sensor further comprises forming a plurality of second pixels wherein each pixel includes a photo element and a switching element to control switching of the photo element, forming a microlens for each of the plurality of second pixels, and forming a color filter for each photo element. The photo element is a photo diode or a photo transistor.

The image sensor may be formed on a non-display portion or a display portion of the transparent substrate.

It is to be understood that both the foregoing general description and the following detailed description of the present invention are exemplary and explanatory and are intended to provide further explanation of the invention as claimed.

BRIEF DESCRIPTION OF THE DRAWINGS

The invention will be described in detail with reference to the following drawings in which like numerals refer to like elements. The accompany drawings, which are included to provide a further understanding of the invention and are incorporated in and constitute a part of this specification, illustrate embodiments of the invention and together with the description serve to explain the principles of the invention.

DETAILED DESCRIPTION

Embodiments of the present invention will be described in a more detailed manner with reference to the drawings.

By utilizing the fact that the structure of a flat display panel and an image sensor of a camera module are similar, one embodiment of the present invention configures the image sensor for the camera module on the transparent substrate of the flat display panel. Thus, the present invention discloses that the size of the camera module is reduced as much as the flat display panel, thereby, the size of the mobile terminal can be optimized.

Further, one embodiment of the present invention discloses that the image signal processor for the camera module is disposed on the transparent substrate of the flat display panel, thereby, the image processing speed of the camera module can be improved.

The flat display panel according to one embodiment of the present invention is not limited in use for a mobile terminal, however, it is obvious to the person skilled in the art that the flat display panel can be used for various apparatus such as a monitor, a digital camera, a video camera, a scanner, a digital copying machine, a facsimile, and a TV.

For convenience of explanation, the flat display panel is an LCD panel, and will be illustrated as applied to a mobile terminal.

Figure 1:
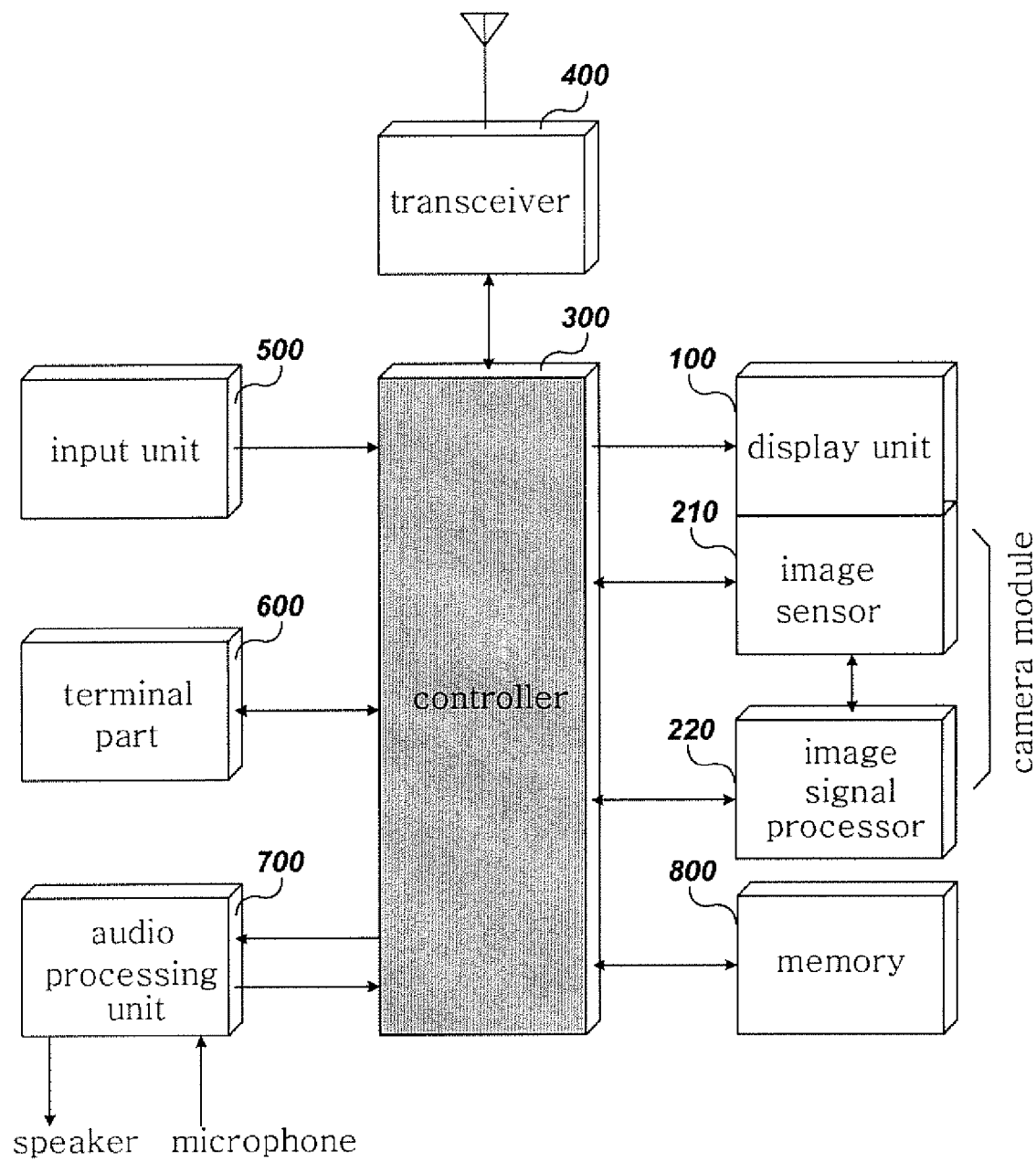
FIG. 1 is a schematic diagram of a mobile terminal in which an image sensor according to an embodiment of the present invention is implemented on a display panel.

FIG. 1 is a schematic diagram of a mobile terminal in which an image sensor according to an embodiment of the present invention is implemented on a display panel. The terminal in which the image sensor is implemented on the display panel comprises a display unit 100, a controller 300, a transceiver 400, an input unit 500, a terminal part 600, an audio processing unit 700 and a memory 800, and further comprises a camera module including an image sensor 210 and an image signal processor 220.

The display unit 100 is a flat panel display (FPD) such as a liquid crystal display (LCD), an organic light-emitting diode (OLED), and a touch screen, displaying various menus through which the user may direct operations of the terminal, and displaying an image captured by the camera module under the control of the controller 300.

The camera module comprises an image sensor 210, a drive integrated circuit for driving the image sensor 210, a lens, a shutter and an image signal processor 220. The image sensor 210 and the image signal processor 220 are implemented in the display unit 100, being substantially implemented in the transparent substrate of the flat display panel.

The controller 300 controls the various terminal functions and controls the various data and signal processing of other functions.

The transceiver 400 performs the telecommunication function of the terminal, and may include an RF transmitter which upconverts the frequency of the transmitted signal, and an RF receiver which amplifies and down-converts the received.

The input unit 500 comprises numeric buttons 0~9, special key buttons such as * and #, and direction key buttons, and is configured to perform the interface function between the user and the terminal controller 300. Various types of input units may be provided including a keypad, a touchscreen, a jog dial, and a joystick. For connecting an external device, the terminal part 600 can connect a joystick or a mouse for controlling the image displayed on the display unit 100.

The memory 800 is comprised of a storage unit such as a flash memory, a RAM, and an Electrically Erasable Programmable Read Only Memory (EEPROM), storing an Operating System (OS) for the operation of the terminal, software, and data.

The memory 800 also includes program memory and data memories. Programs for controlling the general operation of the mobile terminal are stored in the program memory.

An audio processing unit 700 is shown connected to a speaker and a microphone.

The terminal according to one embodiment of the present invention can be a Personal Digital Assistant (PDA), a cellular phone, a Personal Communication Service (PCS) phone, a Global System for Mobile (GSM) phone, a wide band-code division multiple access (Wideband CDMA) phone, a CDMA-2000 phone, or a Mobile Broadband System MBS phone.

Figure 2:
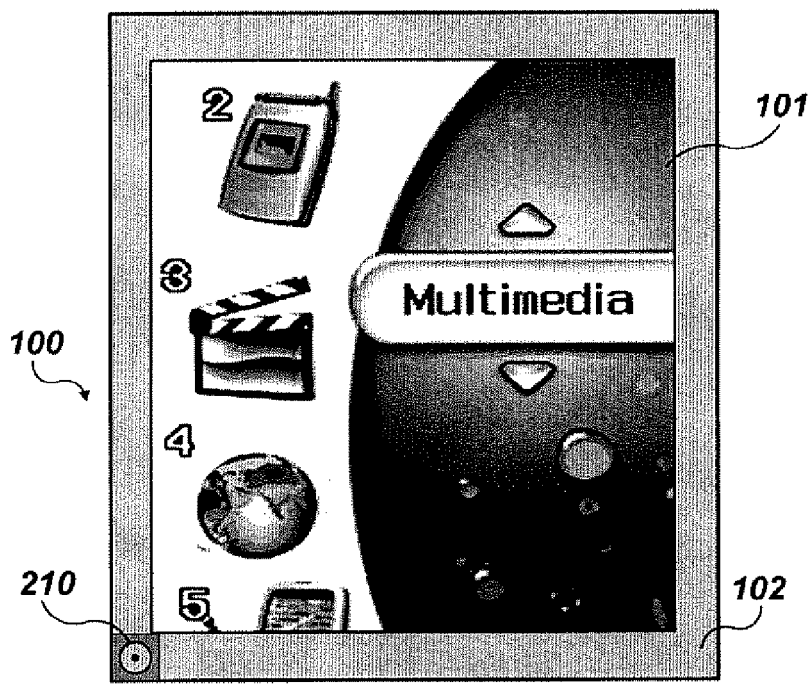
FIG. 2 shows the configuration of a mobile terminal according to FIG. 1.
Figure 2:
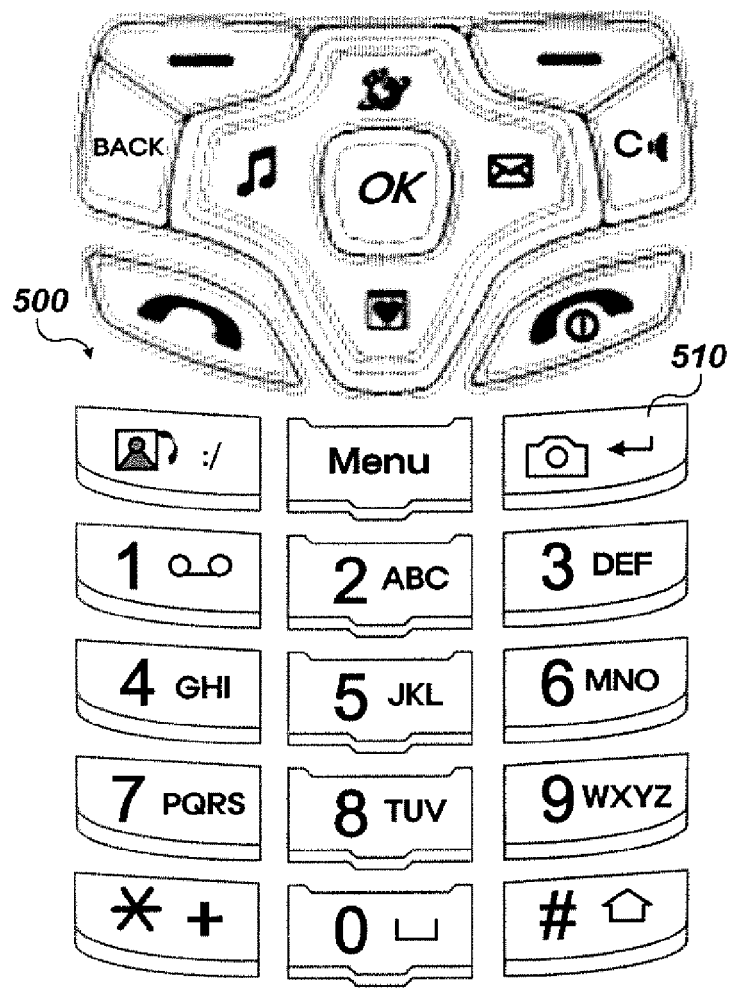

FIG. 2 is a configuration of a mobile terminal according to FIG. 1 showing a display unit 100, an image sensor 210 for the camera module, and an input unit 500. The input unit 500, for example, can be a keypad, while the camera selection button 510 can be installed in the input unit 500.

The display unit 100 is comprised of a display part 101 and a non-display part 102, while the image sensor 210 for the camera module is disposed in the non-display part 102. The image sensor 210 is formed in the bottom left of the display unit 100. The image sensor 210 can be formed in other locations of the non-display part 102, or can be formed in the front of the display unit 101.

Figure 3:
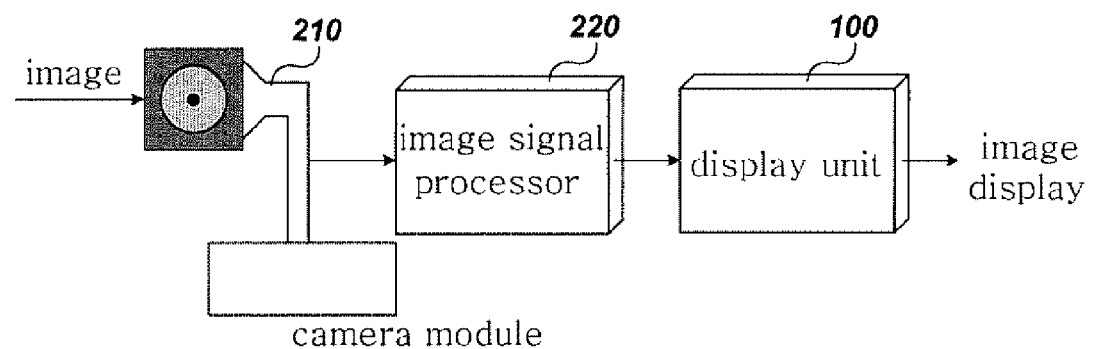
FIG. 3 is a block diagram of the image processing of a camera module.

FIG. 3 is illustrates the image processing function of the camera module. The image of the subject is an image captured with the image sensor 210 of the camera module and converted to an electrical signal. The image signal processor 220 processes the image to be displayed by the display unit 100. The display unit 100 displays the captured image. The detailed configuration and the operation of the image sensor 210 of the camera module will be described later.

Figure 4:
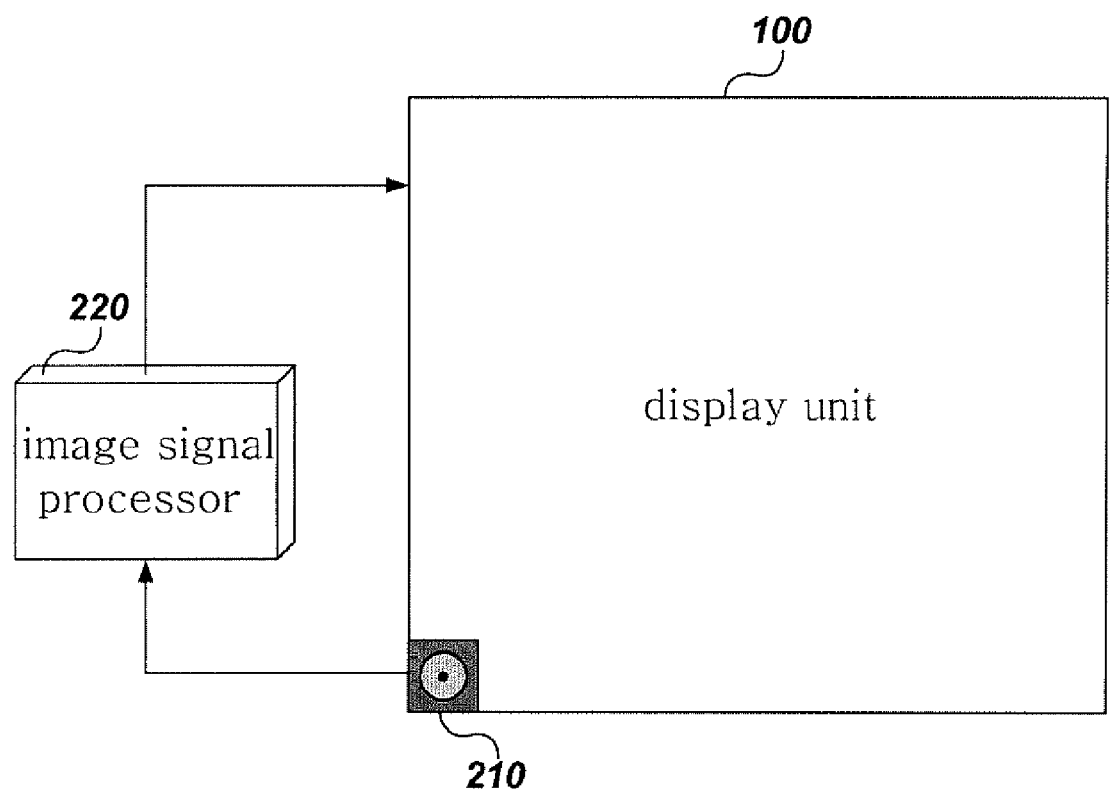
FIG. 4 is a configuration diagram of a flat panel display apparatus having an image sensor according to an embodiment of the present invention.

FIG. 4 is a configuration diagram of a flat panel display apparatus having an image sensor according to an embodiment of the present invention. The flat panel display apparatus including the image sensor is comprised of a flat display panel 100, an image sensor 210, and an image signal processor 220.

The image sensor 210 and the image signal processor 220 form part of the camera module. The image sensor 210 can be formed in the display part or the non-display part, and the image signal processor 220 can be formed in the non-display part of the flat display panel 100, for example, in the pad region.

The flat display panel 100 is comprised of a display part where a plurality of first pixels and a switching element are formed on a transparent substrate and a non-display part where the first pixels are not formed, displaying data through the plurality of first pixels under the control of the switching element.

A plurality of second pixels are formed on the non-display part of the flat display panel 100 and comprise the image sensor 210. The subject is sensed by the second pixels and is converted into an electrical image signal.

The first pixels are formed in the flat display panel 100 to display data external to the terminal, or to display image data from the image signal processor 220.

After the image signal processor 220 converts the image signal from the image sensor 210 into image data, the image data is displayed on the flat display panel 100.

Figure 5A:
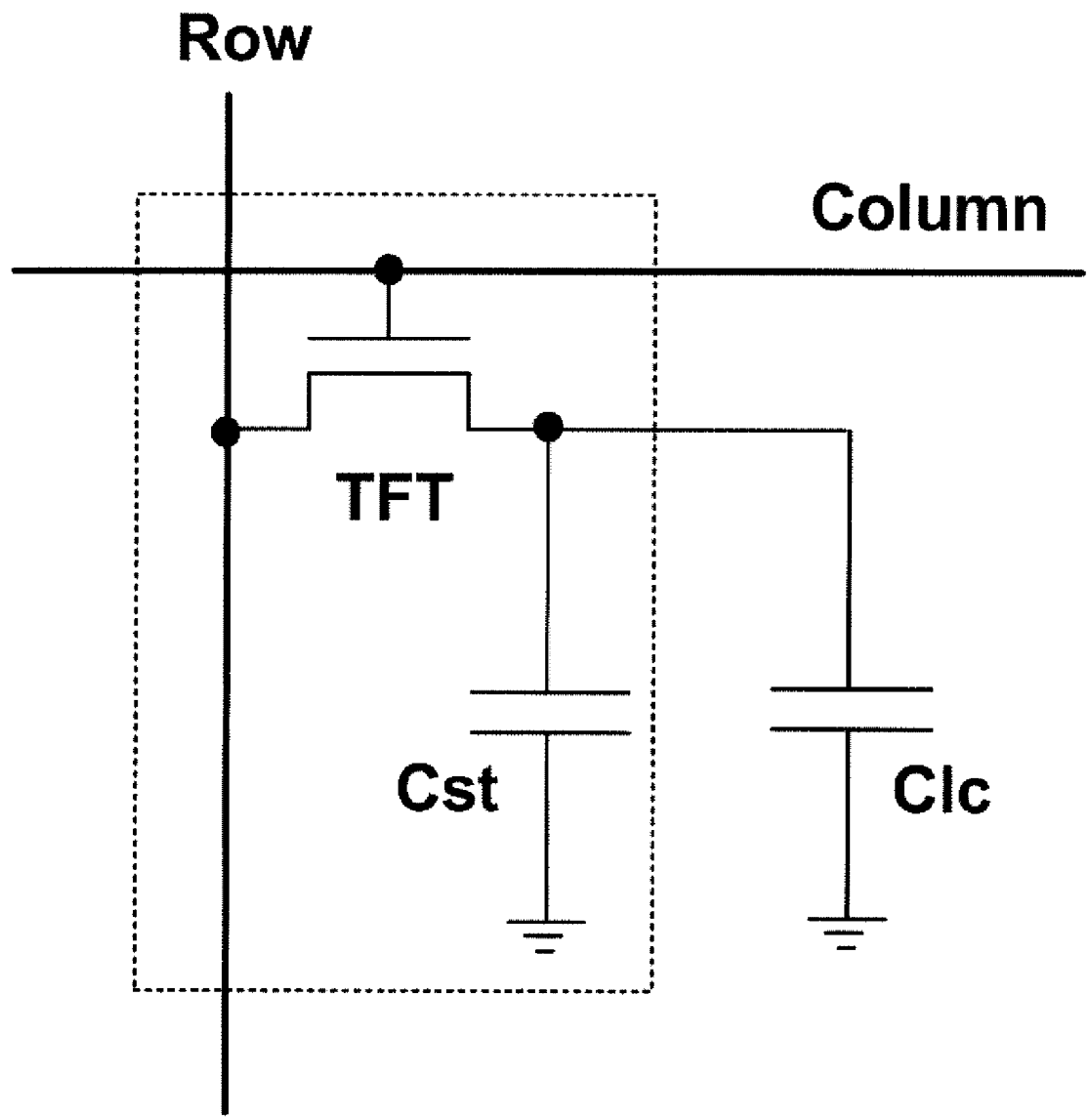
FIG. 5a shows the structure of a pixel of a liquid crystal display apparatus.
Figure 5B:
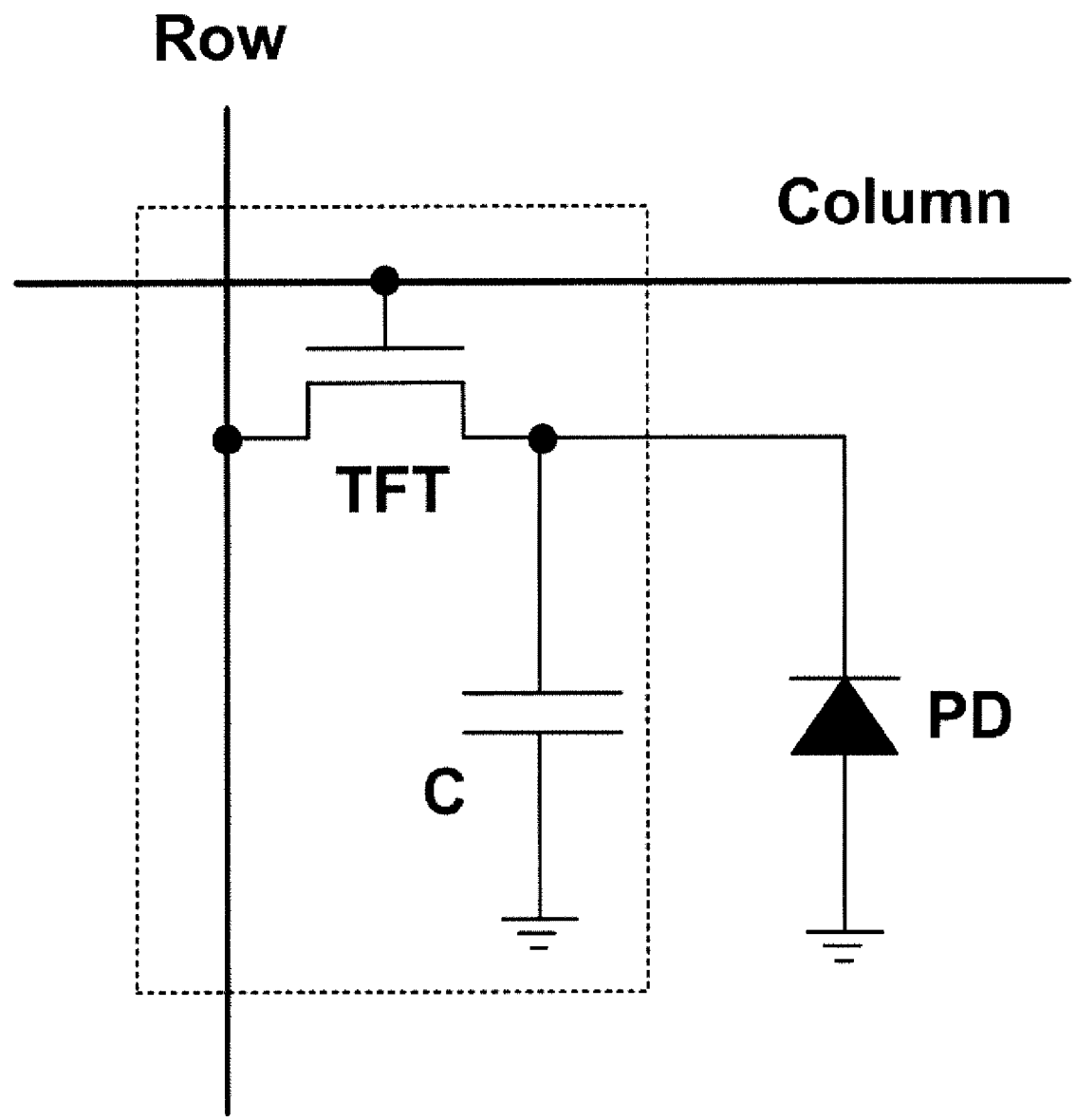
FIG. 5b is the structure of pixel of an image sensor for the camera module.

FIG. 5a shows the structure of an LCD pixel, and FIG. 5b shows the structure of an image sensor pixel of the camera module. The LCD pixel structure shown in FIG. 5a includes a thin film transistor (TFT) and the capacitor, $C_{ST}$. The structure of the image sensor pixel shown in FIG. 5b includes one TFT and one photo diode (PD), although the image sensor pixel may comprise a plurality of transistors configured to achieve the result of the single TFT. The PD area may be larger than that of the TFT switching element. The sense amplifier (SA) for signal amplification and the capacitance for storing the signal are at the end of the sense line.

Therefore, as the optical diode PD for the camera module is added to the liquid crystal display LCD panel, the image sensor of the camera module can be installed on the liquid crystal display LCD panel.

The camera module and the liquid crystal display use the color filter and the TFT as a switching element, while the structure of storing data through a capacitor is identical. That is, the image sensor pixel for the camera module and the pixel structure of the liquid crystal display LCD panel are similar.

In one embodiment of the present invention, the image sensor pixels of the camera module are installed on the liquid crystal display LCD panel structure, and common gate lines and source lines can be used. Further, the image sensor of the camera module can be applied to an OLED panel.

The LCD is a device for displaying an image by using the optical anisotropy of the liquid crystal molecule and its birefringence property. The two substrates in which the electric field generation electrode is formed respectively are arranged so that the surfaces in which the electrode is formed are facing each other, while the liquid crystal material is injected into the gap between the two substrates. Then, the arrangement of the liquid crystal molecule is changed by the electric field which is generated by applying a voltage to the two electrodes. Thus, the amount of the light transmitted by the transparent insulating substrate is controlled thereby displaying an image.

The thin film transistor liquid crystal display TFT LCD using the TFT as a switching element is mainly used for the liquid crystal display device. The light transmission is controlled while the back light, which is a white light, passes through the liquid crystal pixel. The color screen of the TFT-LCD is made by passing the white backlight through a color filter layer of red R, blue B, and green G, arranged on each pixel.

Figure 6:
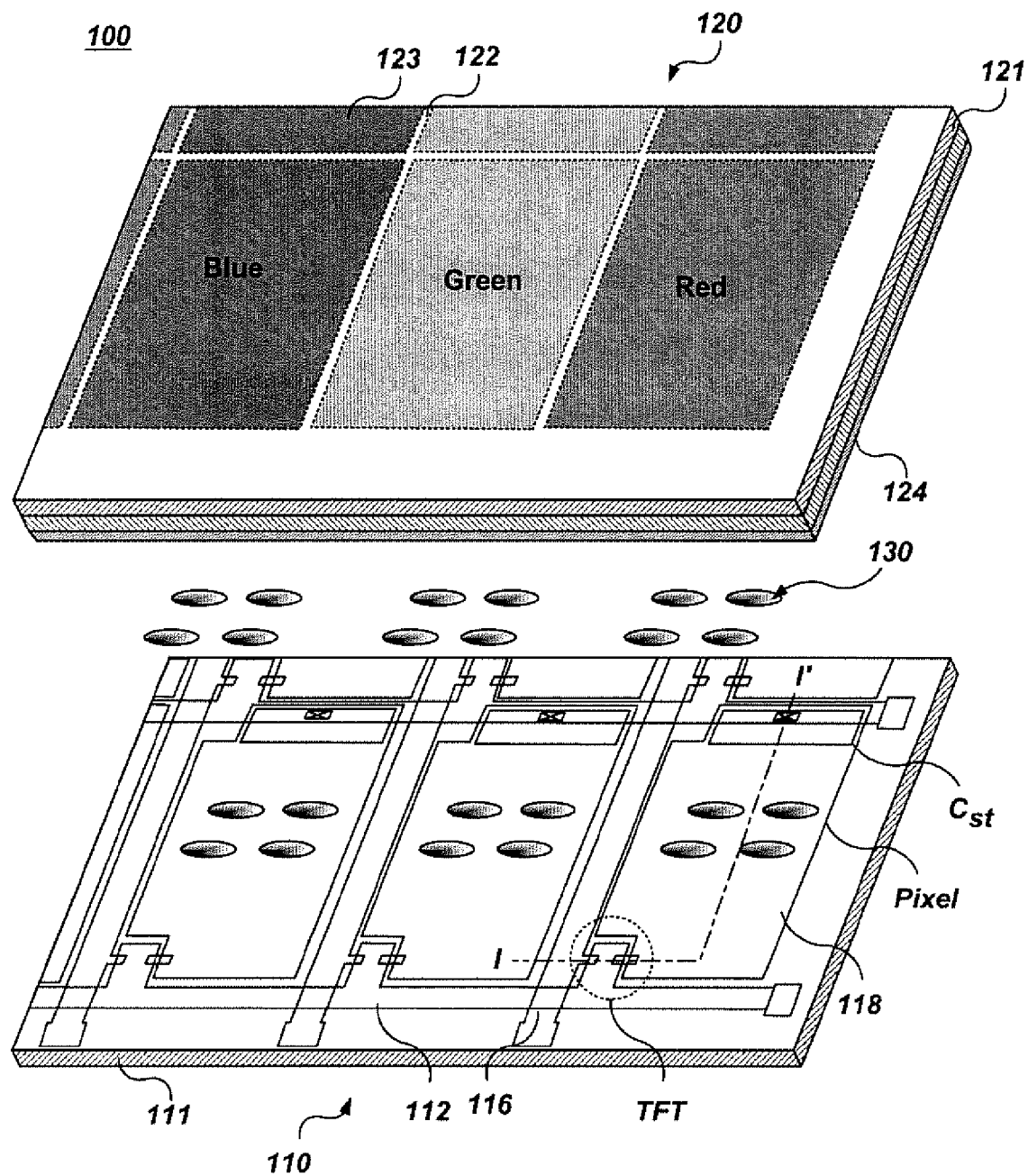
FIG. 6 is a perspective view of a liquid crystal display apparatus.
Figure 7:
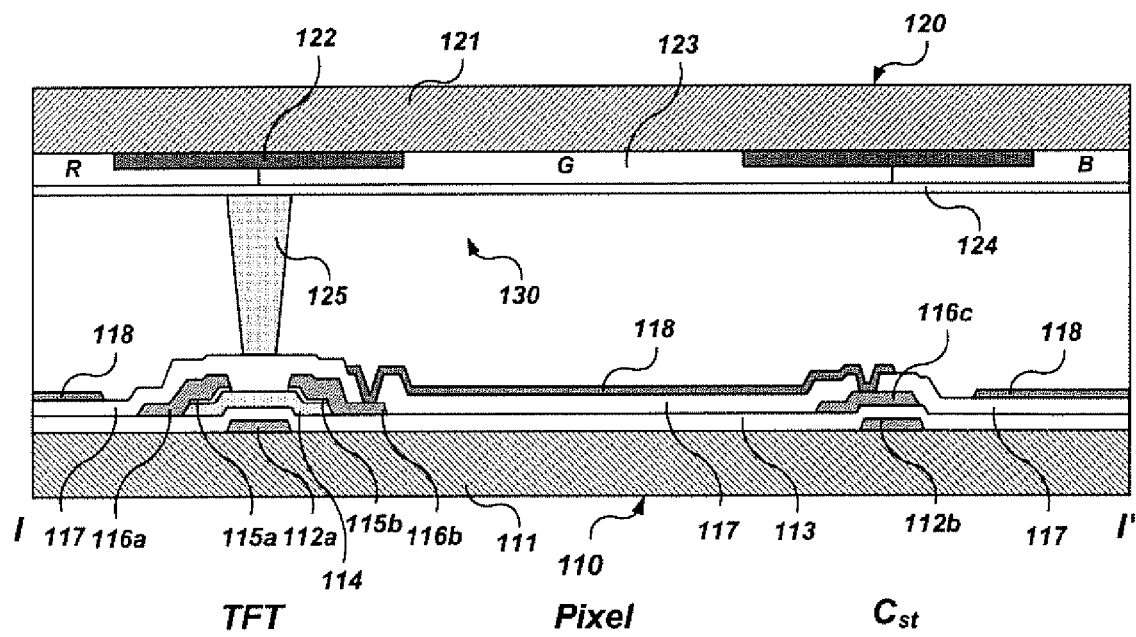
FIG. 7 is an elevation view of I-I' of FIG. 3.

FIG. 6 is a perspective view of a liquid crystal display apparatus, FIG. 7 is an elevation view of I-I' of FIG. 6. The liquid crystal panel installed in the inside of an LCD is comprised of a first substrate 110, a second substrate 120 separated by a constant space, and a liquid crystal layer 130 injected into the gap between the first substrate 110 and the second substrate 120.

The first substrate 110 can be defined having separate areas for the switching domain (TFT), the pixel region (Pixel) and the storage region ($C_{ST}$). The first substrate 110 is comprised of a transparent glass substrate 111, a gate layer 112a, 112b, an interlayer insulating film 113, an active layer 114, an ohmic contact layer 115a, 115b, a data layer 116a, 116b, 116c, a passivation layer 117 and a pixel electrode 118.

Further, the color filter substrate 120 is comprised of a transparent glass substrate 121, a black matrix 122, a color filter 123, and a common electrode 124.

On the first substrate 110, a plurality of gate lines 112 are arranged in a direction having a regular interval and with a plurality of datalines 116 having a regular interval arranged perpendicular to the gate lines 112 on the transparent glass substrate 111. In that way, the pixel region can be defined. In one embodiment of the present invention, the pixel region is formed on the display part, while the pad part in which the gate pad and the data pad are formed is formed on the non-display part.

In each pixel region, the pixel electrode 118 is formed. The TFT is formed in the region where each gate line 112 intersects with dataline 116. The thin film transistor applies the data signal of the dataline 116 to each pixel electrode 118 according to the scan signal which is applied through the gate line 112.

On the second substrate 120, the black matrix 122 for blocking the light of the area except the pixel region is formed on the transparent glass substrate 121. The filter layer 123 for expressing the color is formed in the area corresponding to each pixel region. The common electrode 124 is formed on the upper part of the color filter layer 123.

The storage capacitor $C_{ST}$, connected in parallel with the pixel electrode 118, is formed on the upper part of the gate line 112. Part of the gate line 112 is used as the first electrode of the storage capacitor $C_{ST}$, while the metal pattern having an island shape, which is formed with the same material of the same layer as the source and the drain electrode, is used as the second electrode.

The black matrix 122 corresponding to the TFT, the gate line 112a, 112b, and the dataline 116a, 116b, 116c is formed in an area of the second substrate 120 which faces and is separated from the first substrate 110 by the liquid crystal layer 130, while the color filter 123 is formed in another area of the second substrate 120 which corresponds to the pixel region.

The transparent common electrode 124 is formed in the front of the second substrate 120 on which the color filter 123 and the black matrix 122 are formed. Alternatively, the common electrode 124 may not be formed on the second substrate 120 and it may be formed on the first substrate 110. A spacer 125 is formed between the first substrate 110, which is an array panel, and the second substrate 120, which is a color filter substrate, in order to maintain the gap of the two substrates.

The liquid crystal layer 130 which is formed between the first substrate 110 and the second substrate 120 is oriented by the electric field between the pixel electrode 118 and the common electrode 124. The desired image can be expressed by controlling the amount of the light penetrating the liquid crystal layer 130 according to the orientation of the liquid crystal layer 130.

Figure 8:
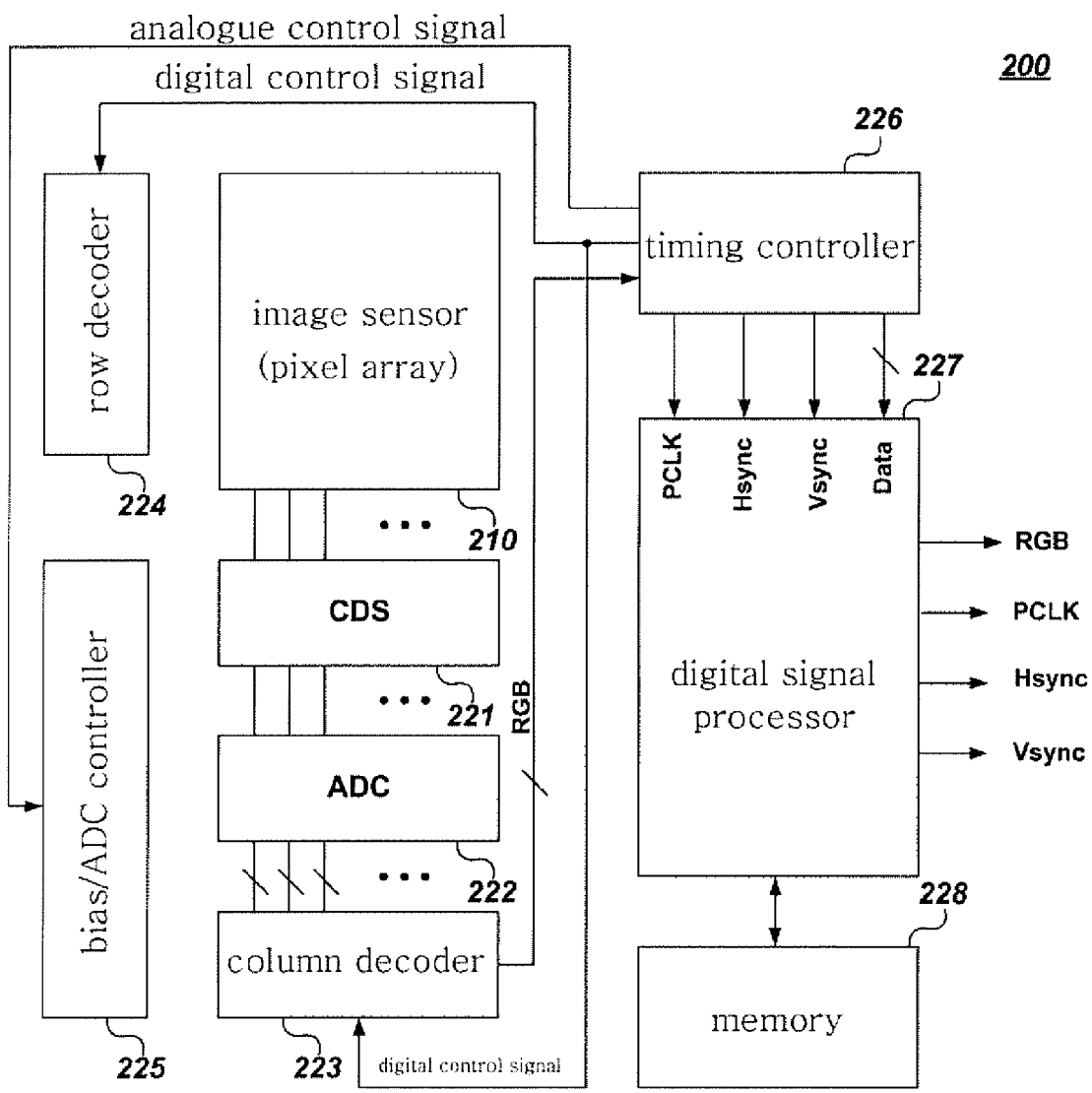
FIG. 8 is a block diagram of a camera module having an image sensor.

FIG. 8 is a block diagram of a camera module having an image sensor. The camera module 200 is comprised of an image sensor 210 of a pixel array, a correlated double sample (CDS) 221, an analog digital converter (ADC) 222, a column decoder 223, a row decoder 224, a bias/ADC controller 225, a timing controller 226, a digital signal processor 227, and a memory 228. However, the camera module is not restricted in such a scope.

The image sensor 210 captures the image of the subject and converts the image into an electrical signal. The CDS 221 removes the noise included in the electric signal provided by the image sensor 210. The ADC 222 converts the analog signal, after noise removal, into the digital signal. The bias/ADC controller 225 controls the operation of the ADC 222.

The column decoder 223 and the row decoder 224 decode the image picked up from the image sensor 210 of pixel array form according to the digital control signal which is provided from the timing controller 226 in a row direction and in a column direction.

The digital signal processor 227 outputs a clock PCLK provided from the timing controller 226, a vertical synchronizing signal Vsync, a horizontal synchronization signal Hsync, and a color data signal RGB by performing digital processing. The digital processed data is stored in the memory 228.

In one embodiment of the present invention, the image sensor 210 is implemented on the substrate of the flat display panel.

Figure 9:
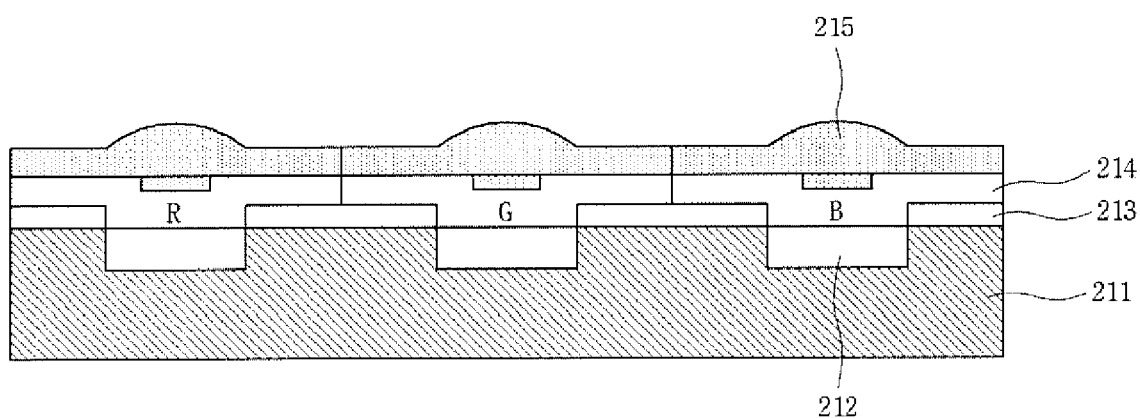
FIG. 9 is an elevation view of an image sensor for the camera module.

FIG. 9 is an elevation view of an image sensor for the camera module. The image sensor 210 is implemented on the substrate of the flat display panel. A photo element (a photo diode or a photo transistor) 212 is formed on the substrate 211. A color filter 214 is formed on the photo element 212.

The color filter 214 is separated by a separation layer 213. A micro lens 215 corresponding to each color filter is formed on the upper part of the color filter 214.

Therefore, the image sensor having the structure of FIG. 9 captures the image of the subject through the micro lens 215. After the image is separated by color via the color filter 214, the image is transformed into an electrical signal by the photo element 212. After the electrical signal is stored in the capacitor (not shown), it is processed by the image signal processor 220.

The image sensor 210 is deposed on the substrate of the flat panel display described above in a pixel array. A lens collecting a light and filter blocking the infrared ray are fixed to the housing in the upper portion of the image sensor 210.

The image sensor 210 may be a CMOS image sensor chip or a CCD image sensor chip having the pixel resolution corresponding to VGA, SVGA, and SXGA according to need. After receiving the image signal from the photo element, the image sensor 210 changes the image signal into a digital image signal using an analog-digital convertor ADC.

According to the manufacturing process, as described in the above, the image sensor 210 can be classified into a CMOS or a CCD.

The CMOS sensor is comprised of a photoelectric conversion semiconductor and a CMOS switch, and converts the light energy to an electrical charge by the semiconductor switch. Further, the CCD image sensor is comprised of a photoelectric conversion semiconductor and a charge coupled device, and also converts the light energy to an electrical charge after accumulation.

In one embodiment of the present invention, the Low Temperature Poly Silicon (LTPS) TFT is used as the switching element of the flat display panel and the image sensor 210. The LTPS is a technology that makes a large area TFT LCD like the preexistence amorphous a-Si group by forming TFT on the upper part of a glass substrate below a temperature 600 degrees centigrade by using laser technology.

Figure 10:
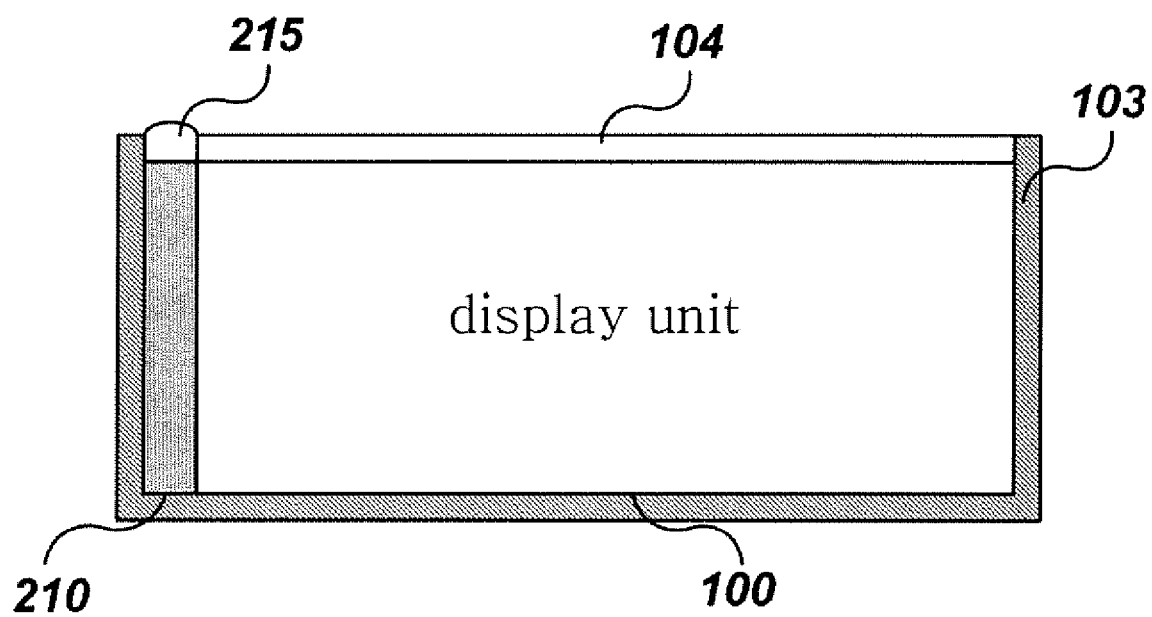
FIG. 10 shows the combination form of a display panel and image sensor according to an embodiment of the present invention.

FIG. 10 shows the combination form of a display panel according to one embodiment of the present invention.

In general, the camera module laminates two or three lenses, and according to one embodiment of the present invention, the lens can be implemented by using the upper plate glass of the flat display panel and an outer housing window 104 structure. In other words, the display unit 100, which is formed by sealing the upper and lower substrate, is installed in the outer housing 103. One side of the outer housing window 104 combined with the outer housing 103 can form the lens 215 for the image sensor 210.

Accordingly, the camera module according to one embodiment of the present invention can reduce the thickness of the terminal over the conventional camera module. At this time, the lens 215 formed in the image sensor 210 and the lens 215 formed in the outer housing window 103 to form a lens group.

Figure 11:
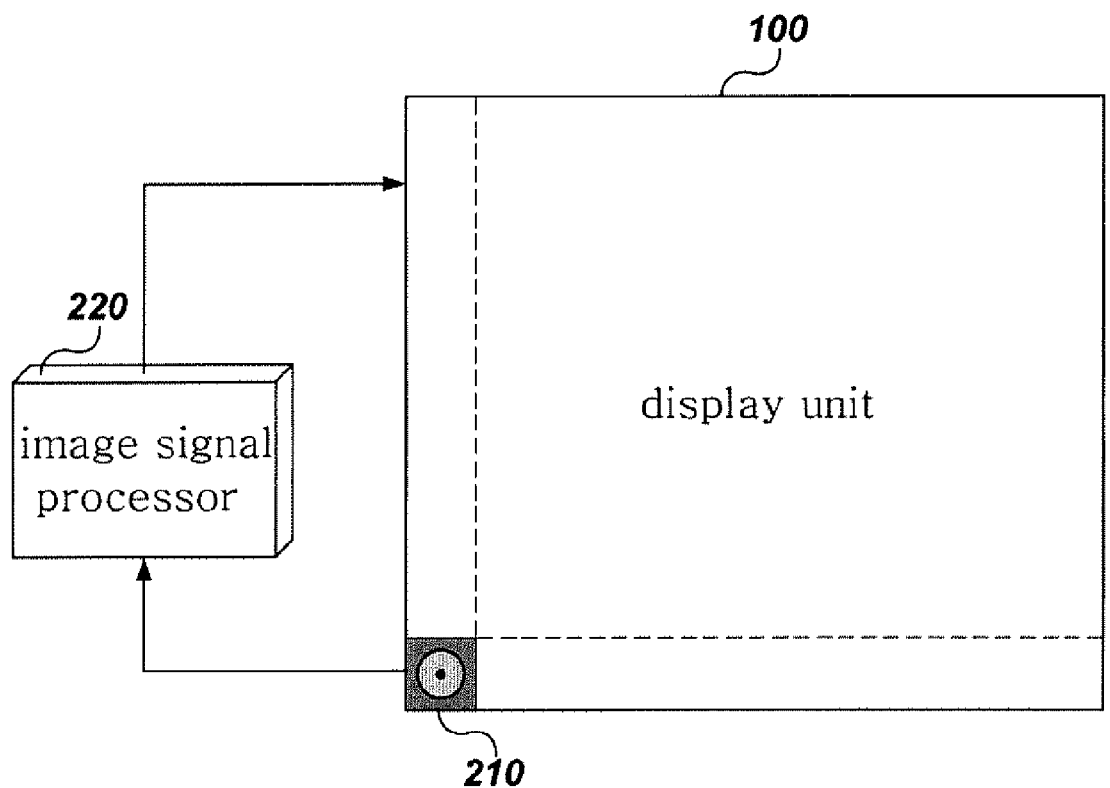
FIG. 11 is a schematic diagram of a flat panel display having an image sensor according to one embodiment of the present invention.

FIG. 11 is a schematic configuration diagram of a flat panel display having an image sensor according to one embodiment of the present invention. The flat panel display including the image sensor is comprised of a first display unit 100, an image sensor 210 and an image signal processor 220.

The first display unit 100 is comprised of a display part where a plurality of first pixels and switching elements are formed on the transparent substrate, and a non-display part where the first pixel is not formed, wherein the plurality of first pixels display data under the control of the switching elements.

The first display unit 100 is a display panel is one of an LCD, a PDP, and an OLED display device.

A plurality of second pixels is formed in the non-display part of the substrate for the first display unit 100 to form the image sensor 210. The image sensor 210 senses the subject through the plurality of second pixels and converts the image into an electrical image signal.

As described above, the image sensor 210 can be a CMOS or a CCD. Further, the image sensor 210 can share the gate lines and the source/data lines connected to the switching element of the first display unit 100.

The image signal processor 220 converts the electrical image signal provided by the image sensor 210 into the image data which is to be displayed through the first display unit 100.

Figure 12:
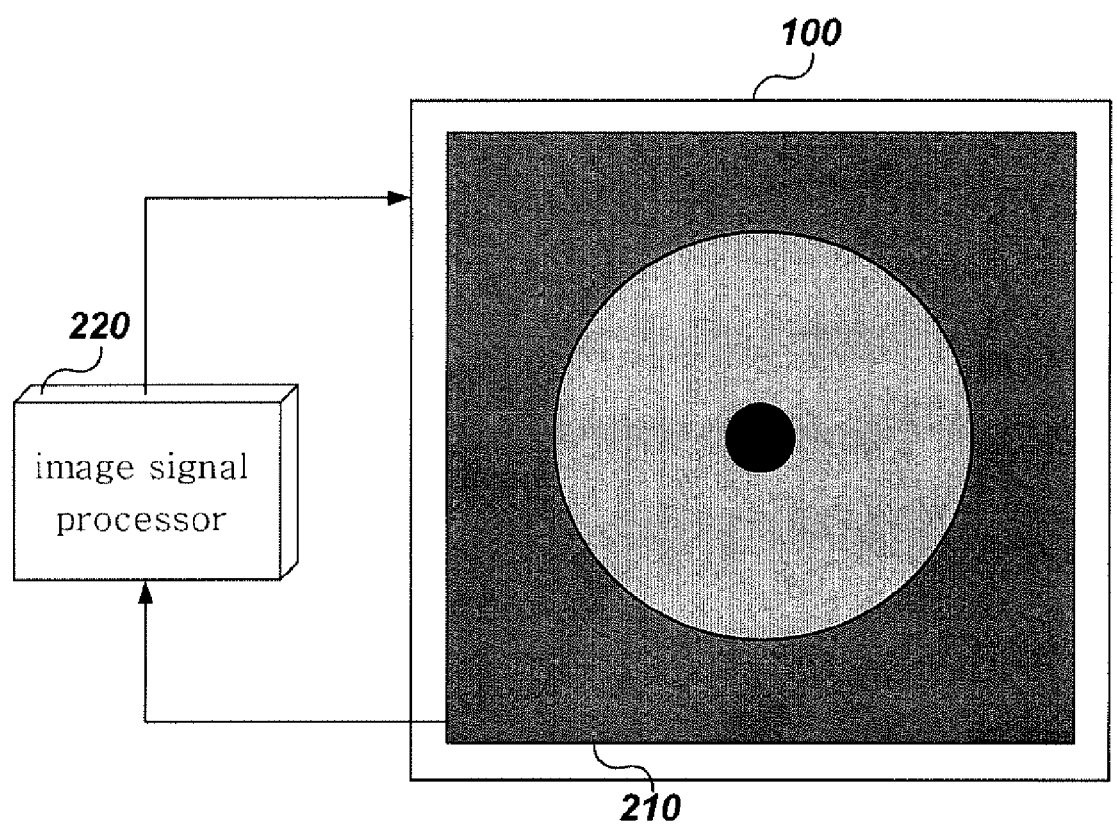
FIG. 12 is a schematic configuration diagram of a flat panel display having an image sensor according to another embodiment of the present invention.

FIG. 12 is a schematic configuration diagram of a flat panel display having an image sensor according to another embodiment of the present invention. The flat panel display having the image sensor is comprised of a first display unit 100, and an image signal processor 220.

The first display unit 100 is comprised of a display part in which a plurality of first pixels and switching elements are formed on a transparent substrate and a non-display part where first pixels are not formed, wherein the plurality of first pixels display data under the control of the switching elements.

A plurality of second pixels is formed on the front side of the display part of the substrate for the first display unit 100 with the plurality of first pixels to form the image sensor 210. The subject is sensed through the second pixels and is converted into an electrical image signal.

The image signal processor 220 converts the electrical image signal provided by the image sensor 210 into the image data which is to be displayed through the first display unit 100. In this embodiment, the image sensor 210 is formed on the front side of the display part of the substrate for the first display unit 100. That is, the image sensor pixels for the camera module corresponding to the pixels formed in the first display unit 100 are formed together. Thus, the first display unit 100 plays the role of the image sensor 210.

Figure 13:
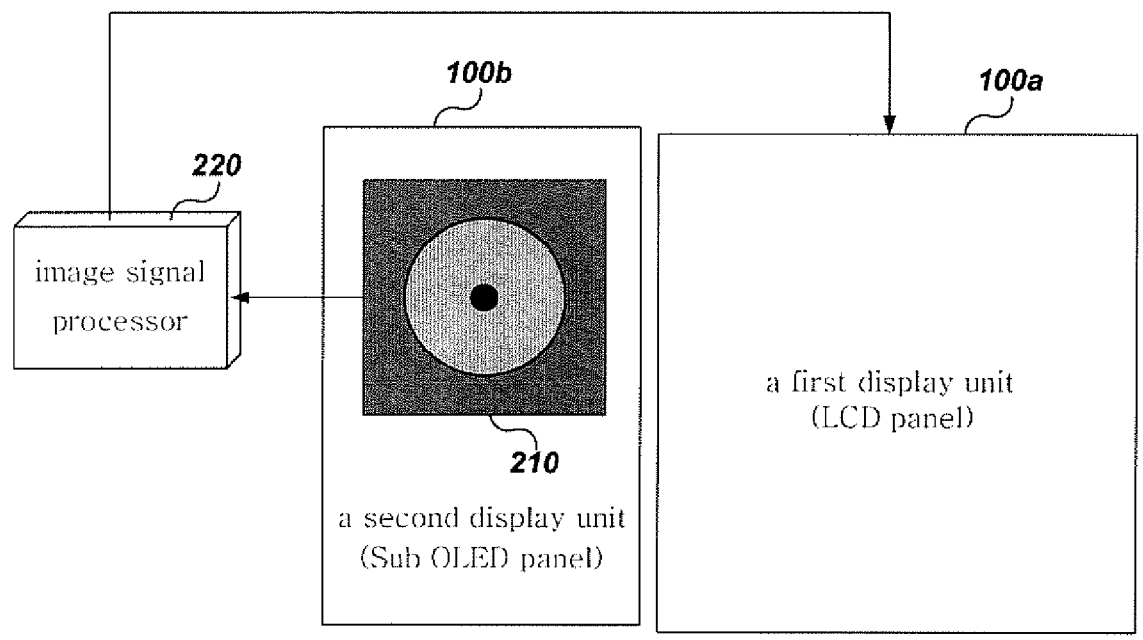
FIG. 13 is a schematic configuration diagram of a flat panel display having an image sensor according to yet another embodiment of the present invention.

FIG. 13 is a schematic configuration diagram of a flat panel display having an image sensor according to a yet another embodiment of the present invention. The flat panel display including the image sensor is comprised of a first display unit 100*a*, an image sensor 210, an image signal processor 220 and a second display unit 100*b*.

The first display unit 100*a* is comprised of a display part in which a plurality of first pixels and switching elements are formed on a transparent substrate and a non-display part where the first pixels are not formed, wherein the plurality of first pixels display data under the control of the switching elements.

The first display unit 100*a* is a display panel is one of an LCD, PDP, and an OLED display device A plurality of second pixels is formed in the non-display part of the substrate for the first display unit 100*a* to form the image sensor 210. The subject is sensed through the second pixels and is converted into an electrical image signal. As described above, the image sensor 210 can be a CMOS device or a CCD. Further, the image sensor 210 can share the gate lines and the source/data lines connected to the switching elements of the first display unit 100*a*.

The image signal processor 220 converts the electrical image signal provided by the image sensor 210 into the image data which is to be displayed on the first display unit 100*a*.

The second display unit 100*b* is located on the rear side of the first display unit 100*a*, displaying image data processed by the image signal processor 220. In the same manner, the second display unit 100*b* can be an LCD, a PDP, or an OLED display device.

For example, the first display unit 100*a* can be an OLED, while the second display unit 100*b* can be an LCD. In other words, if the folder of the terminal is opened, the first display unit 100*a* is operated like the image sensor 210 of the camera module and the image can be displayed in the second display unit 100*b*.

Figure 14:
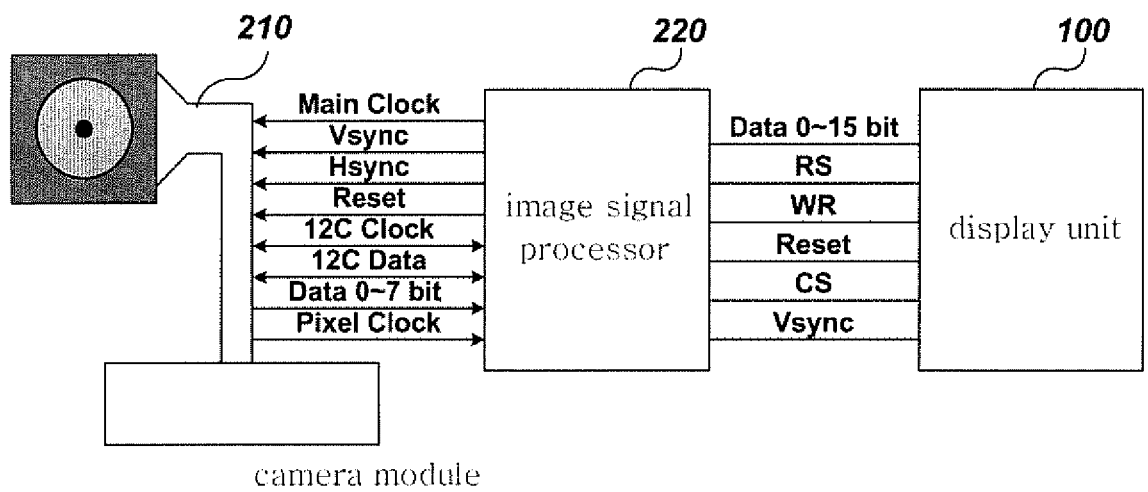
FIG. 14 shows the image signal processing of a camera module.
Figure 15:
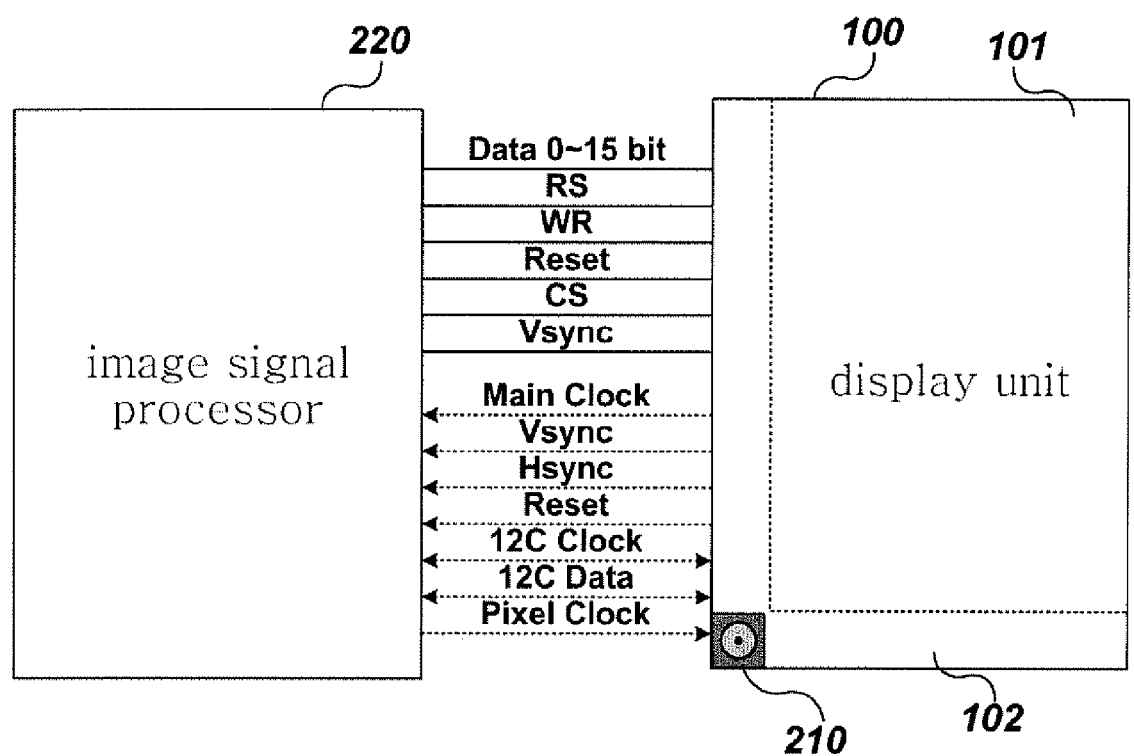
FIG. 15 shows the image signal processing of a flat panel display apparatus having an image sensor according to an embodiment of the present invention.

FIG. 14 shows the image signal processing of a camera module. FIG. 15 is a drawing showing the image signal processing of a flat panel display apparatus having an image sensor according to one embodiment of the present invention. The image captured by the image sensor 210 is displayed in the display unit 100 via the image signal processor 220. Therefore, the update speed of an image is slow and noise deteriorates the image quality.

Referring to FIG. 15, the image data of the image signal processor can share the data bus of the first flat display panel to display the image data. In detail, by using eight 0~7 bit data lines of the camera module with sharing 0~15 bit data of the flat display panel, the flexible printed circuit board (FPCB) wiring can be reduced in the hardware. For example, 0~7 bit data is used when camera data is used, while 0~15 bit data can be used for the display update.

Figure 16:
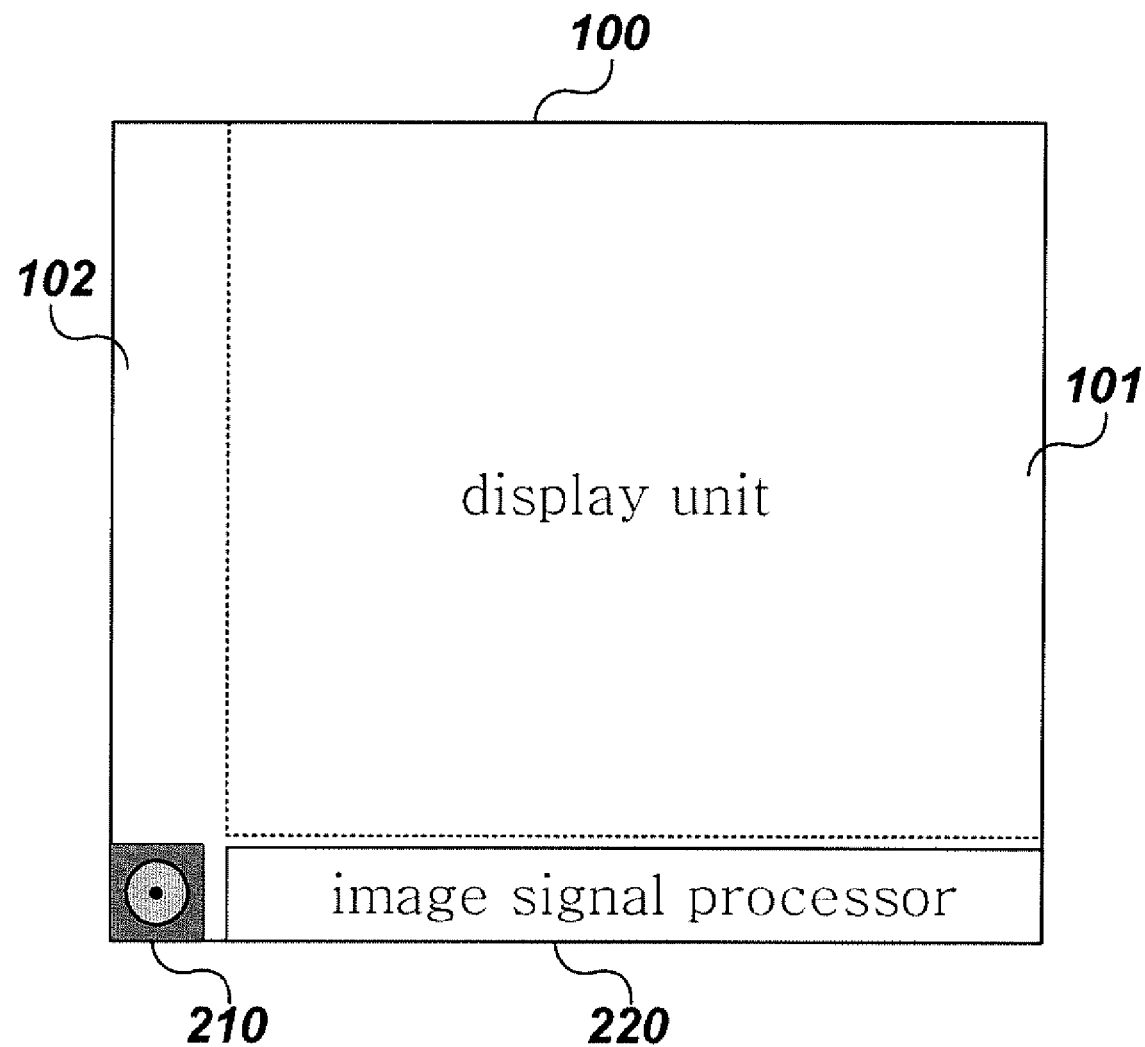
FIG. 16 shows the image signal processing of a flat panel display apparatus having an image sensor and an image signal processor according to another embodiment of the present invention.

FIG. 16 shows the image signal processing of a flat panel display apparatus having an image sensor and an image signal processor according to another embodiment of the present invention. The image signal processor 220 can be installed in the non-display part of the first flat display panel 100.

When the image sensor of the camera module is implemented in the OLED or LCD panel, the image processing part, such as an image signal processor (ISP), ADC, or a digital signal processor is disposed on the non-display part of the display unit 100. Thus, the camera image is not delivered to the image signal processor 220, but is immediately image-processed while the image is displayed in the flat display panel.

In the conventional interface, the image signals were connected from the image signal processor 220 to the image sensor 210 for control. However, according to one embodiment of the present invention, it is sufficient for the image signal processor 220 to connect with the camera control signal. Accordingly, the flat panel display having the image sensor according to the embodiment of the present invention can improve the image update speed, and improve the image quality due to noise reduction.

Figure 17:
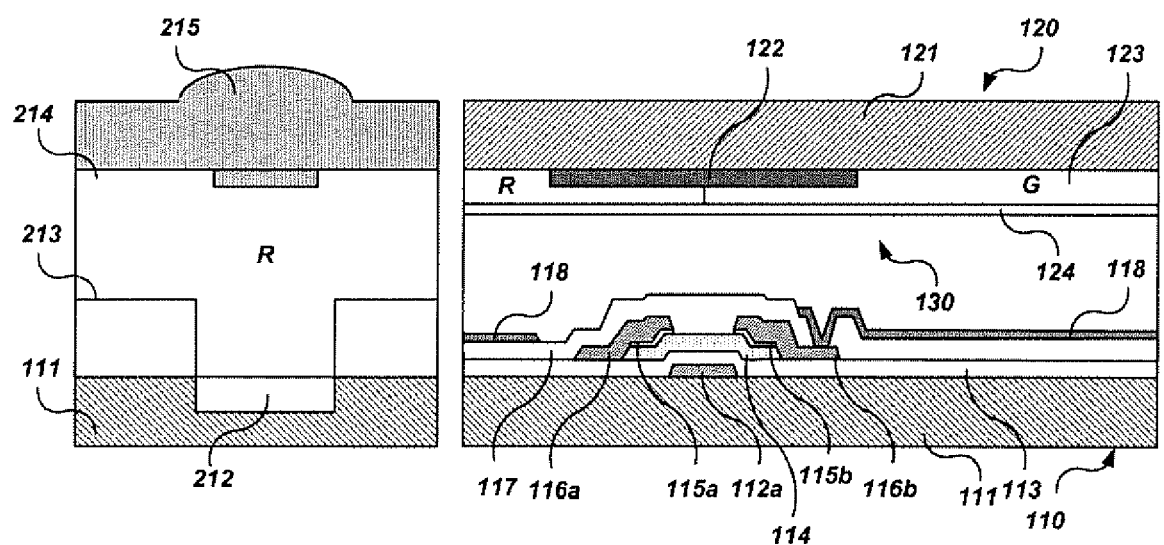
FIG. 17 is an elevation view of a flat panel display apparatus having an image sensor according to an embodiment of the present invention.

FIG. 17 is a side view of a flat panel display apparatus having an image sensor according to one embodiment of the present invention. The switching element for the flat display panel and pixel are formed on the transparent substrate 111 of the display unit; the image sensor is formed on the non-display part of the transparent substrate. The micro lens 215 is formed on the pixel of the image sensor.

The photo element 212 of the sensor pixel is formed on the transparent substrate 111. The switching element controlling the switching of the photo element 212 is also formed on the transparent substrate 111. The RGB color filter 214, separated by a separation unit 213, is additionally formed on the photo element 212, and the micro lens 215 is formed on the RGB color filter 214.

Figure 18:
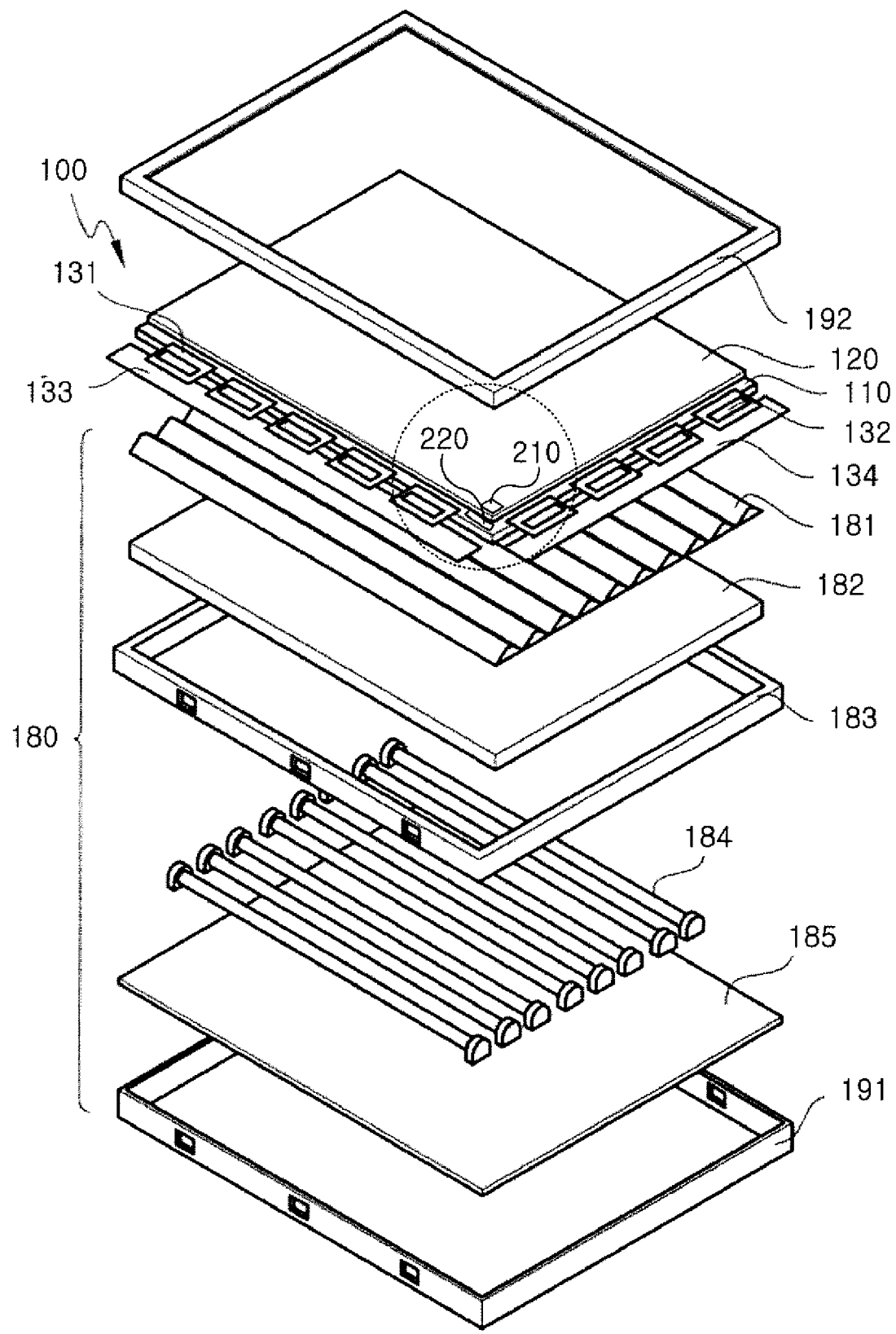
FIG. 18 is a disassembled perspective view of a liquid crystal display having an image sensor and an image signal processor according to an embodiment of the present invention.

FIG. 18 is a disassembled perspective view of a liquid crystal display having an image sensor and an image signal processor according to one embodiment of the present invention showing that the image sensor 210 and the image processor 220 are implemented in the flat display panel. The liquid crystal display comprises a liquid crystal display panel 100, a backlight unit 180 and a top chassis 192. The image sensor 210 and the image signal processor 220 are formed on the upper and lower substrate 110, 120 of the liquid crystal display panel 100. The liquid crystal display panel 100 further comprises a lower substrate 1101 an upper substrate 120, a liquid crystal (not shown), a gate tape carrier package TCP 131, a gate printed circuit board PCB 133, a data tape carrier package TCP 132, and a data printed circuit board PCB 134.

The lower substrate 110 includes gate lines, data lines, thin film transistors, and pixel electrodes. The upper substrate 120 faces the lower substrate 110 on the front of the lower substrate 110, and includes the common electrode and the color filter. If the common electrode is an in-plane-switching IPS mode, the common electrode can be formed in the lower substrate 110.

The gate taped carrier package (TCP) 131 is connected to each gate line formed on the lower substrate 110, while the data TCP 132 is connected to each data line formed on the lower substrate 110.

The gate printed circuit board (PCB) 133 and the data PCB 134 are connected to the gate TCP 131 and the drive TCP 132, respectively, for processing the gate driving signals and the data driving signals.

The backlight unit 180 comprises an optical sheet 181, a diffusing plate 182, a mold frame 183, a lamp 184 and a reflector 185. The lamp 184 emits the light, and the reflector 185, installed on the lower part of the lamp 184, reflects the light emitted from the lower part of the lamp 184 to the upper diffuser 182. After being diffused by the diffusing plate 182, the light emitted from the lamp 184 and the light reflected by the reflector 185 are collected by the optical sheet 181, which is, for example, a prism.

The elements of the backlight unit 180 are implemented in the internal space between the combination of the mold frame 183 and the bottom chassis 191. The bottom chassis 191 is combined with the top chassis 192 to form the whole frame of the liquid crystal display.

According to embodiments of the present invention, the image sensor for the camera module is formed on the substrate of the flat display panel. Thus, the thickness of the camera module can be reduced, and accordingly, the thickness of the terminal can be reduced.

Further, the image processing speed of the camera module can be improved by implementing the image signal processor for the camera module on the flat display panel.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A flat display apparatus comprising:
   a first flat display panel comprising a display portion and a non-display portion of a transparent substrate, wherein a first plurality of pixels and a first plurality of switching elements are disposed on the display portion, and wherein the first plurality of pixels is configured to display data under control of the first plurality of switching elements;
   an image sensor configured to convert an image into an electrical image signal, wherein the image sensor comprises a second plurality of pixels and a second plurality of switching elements, and wherein the image sensor is disposed on the transparent substrate;
   an image signal processor configured to convert the electrical image signal into image data for display on the display portion of the first flat display panel; and
   a second flat display panel configured to display image data from the image signal processor, wherein the second flat display panel is located on a rear surface of the first flat display panel.

2. The apparatus of claim 1, wherein the image sensor is one of a complementary metal oxide semiconductor (CMOS) and a charge coupled device (CCD).

3. The apparatus of claim 1, wherein the first flat display panel is a liquid crystal display (LCD), a plasma display panel (PDP), or an organic light-emitting diode (OLED) display device.

4. The apparatus of claim 1, wherein the image signal processor is disposed on the non-display portion of the first flat display panel.

5. The apparatus of claim 1, wherein at least one gate line and at least one data line are connected between the image sensor and the first plurality of switching elements.

6. The apparatus of claim 1, wherein the image data of the image signal processor is transmitted to the display portion of the first flat display panel over a data bus.

7. The apparatus of claim 1, wherein the second flat display panel is a liquid crystal display (LCD), a plasma display panel (PDP), or an organic light-emitting diode (OLED) display device.

8. The apparatus of claim 1, wherein the image sensor is disposed on the non-display portion or the display portion of the transparent substrate.

9. A mobile terminal comprising:
   an input unit configured to receive data from a user;
   a first display unit configured to display data or an image;
   an image sensor formed on a transparent substrate of the display unit configured to convert an image of a subject into an electrical image signal;
   an image signal processor configured to convert the electrical image signal from the image sensor into image data for display on the first display unit;
   a controller configured to control, responsive to data from the user, the display of data or an image on the first display unit; and
   a second display unit configured to display image data from the image signal processor, wherein the second display unit is located on a rear surface of the first display unit.

10. The terminal of claim 9, wherein the first display unit is comprised of a display portion and a non-display portion,
   wherein a first plurality of pixels and a first plurality of switching elements are disposed on the display portion, and
   wherein the first plurality of pixels is configured to display data under control of the first plurality of switching elements.

11. The terminal of claim 10, wherein the image sensor is disposed on the non-display portion or the display portion of the transparent substrate.

12. The terminal of claim 9, wherein the image sensor is a complementary metal oxide semiconductor (CMOS) or a charge coupled device (CCD).

13. The terminal of claim 9, wherein the image signal processor is disposed on the non-display portion of the transparent substrate.

14. The mobile terminal of claim 9, wherein the first display unit is one of a liquid crystal display (LCD), a plasma display panel (PDP), and an organic light-emitting diode (OLED) display device.

15. The mobile terminal of claim 9, wherein the second display unit is one of a liquid crystal display (LCD), a plasma display panel (PDP), and an organic light-emitting diode (OLED) display device.

* * * * *